(12) United States Patent
Van Handel

(10) Patent No.: US 7,938,313 B1
(45) Date of Patent: *May 10, 2011

(54) DISPOSABLE THERMALLY INSULATED CUP AND BLANK THEREFOR

(75) Inventor: Gerald J. Van Handel, Neenah, WI (US)

(73) Assignee: Dixie Consumer Products LLC, Atlanta, GA (US)

( * ) Notice: Subject to any disclaimer, the term of this patent is extended or adjusted under 35 U.S.C. 154(b) by 73 days.

This patent is subject to a terminal disclaimer.

(21) Appl. No.: 12/319,615

(22) Filed: Jan. 9, 2009

Related U.S. Application Data

(63) Continuation of application No. 11/613,834, filed on Dec. 20, 2006, now Pat. No. 7,600,669, which is a continuation of application No. 10/797,949, filed on Mar. 10, 2004, now Pat. No. 7,464,856, which is a continuation of application No. 10/367,288, filed on Feb. 14, 2003, now Pat. No. 6,729,534, which is a continuation of application No. 10/199,211, filed on Jul. 19, 2002, now Pat. No. 6,536,657.

(60) Provisional application No. 60/306,757, filed on Jul. 20, 2001.

(51) Int. Cl.
*B65D 3/22* (2006.01)
(52) U.S. Cl. .......... 229/403; 220/62.12; 220/62.18; 220/62.2; 220/62.22; 229/4.5; 229/5.84; 428/34.2; 428/34.9
(58) Field of Classification Search .............. None
See application file for complete search history.

(56) References Cited

U.S. PATENT DOCUMENTS

| | | | |
|---|---|---|---|
| 593,316 A | 11/1897 | Woodman |
| 1,157,008 A | 10/1915 | Lang |
| 1,407,688 A | 2/1922 | Banton |
| 1,756,243 A | 4/1930 | Benson |
| 1,944,042 A | 1/1934 | Thompson |
| 2,266,828 A | 12/1941 | Sykes |
| 2,563,352 A | 8/1951 | Morse |
| 2,678,764 A | 5/1954 | Carlson |
| 2,853,222 A | 9/1958 | Gallagher |
| 2,961,849 A | 11/1960 | Hitchcock |
| 3,082,900 A | 3/1963 | Goodman |
| 3,134,307 A | 5/1964 | Loeser |
| 3,203,611 A | 8/1965 | Anderson et al. |
| 3,237,834 A | 3/1966 | Davis et al. |
| 3,246,745 A | 4/1966 | Stoker, Jr. |

(Continued)

FOREIGN PATENT DOCUMENTS

JP 06-219474 A 8/1994

(Continued)

OTHER PUBLICATIONS

International Search Report for PCT/US2006/025916 having a mail date of Mar. 11, 2006.

(Continued)

*Primary Examiner* — Gary E Elkins
(74) *Attorney, Agent, or Firm* — William W. Letson

(57) ABSTRACT

A container blank comprises at least one substrate layer made of disposable material and at least one film layer disposed substantially over the substrate layer and having at least one portion adapted to shrink away from the substrate layer upon application of heat. The shrunk film layer portion is adapted to thermally insulate the substrate layer located substantially behind the shrunk film layer portion.

19 Claims, 8 Drawing Sheets

U.S. PATENT DOCUMENTS

| | | |
|---|---|---|
| 3,402,874 A | 9/1968 | Sternall |
| 3,406,814 A | 10/1968 | Gulliver |
| 3,627,166 A | 12/1971 | Walter |
| 3,669,337 A | 6/1972 | Struble |
| 3,737,093 A | 6/1973 | Amberg et al. |
| 3,781,183 A | 12/1973 | Doll |
| 3,854,583 A | 12/1974 | Amberg et al. |
| 3,988,521 A | 10/1976 | Fumel et al. |
| 3,995,740 A | 12/1976 | Amberg et al. |
| 4,051,951 A | 10/1977 | Smith |
| 4,087,003 A | 5/1978 | Adamek |
| 4,197,948 A | 4/1980 | Amberg et al. |
| 4,261,501 A | 4/1981 | Watkins et al. |
| 4,332,635 A | 6/1982 | Holbrook et al. |
| 4,359,160 A | 11/1982 | Myers et al. |
| 4,383,422 A | 5/1983 | Gordon et al. |
| 4,398,904 A | 8/1983 | Fagerberg |
| 4,435,344 A | 3/1984 | Iioka |
| 4,452,596 A | 6/1984 | Clauss et al. |
| 4,459,793 A | 7/1984 | Zenger |
| 4,486,366 A | 12/1984 | Reddy |
| 4,514,354 A | 4/1985 | Schlesinger et al. |
| 4,551,366 A | 11/1985 | Maruhashi et al. |
| 4,679,724 A | 7/1987 | Inagaki |
| 4,692,132 A | 9/1987 | Ikushima et al. |
| 4,923,557 A | 5/1990 | Dickey |
| 4,971,845 A | 11/1990 | Aaker et al. |
| 4,982,872 A | 1/1991 | Avery |
| 4,985,300 A | 1/1991 | Huang |
| 5,001,016 A | 3/1991 | Kondo et al. |
| 5,063,005 A | 11/1991 | Doheny, Jr. |
| 5,092,485 A | 3/1992 | Lee |
| 5,145,107 A | 9/1992 | Silver et al. |
| 5,205,473 A | 4/1993 | Coffin, Sr. |
| 5,217,307 A | 6/1993 | McClintock |
| 5,279,872 A | 1/1994 | Ralph |
| 5,460,323 A | 10/1995 | Titus |
| 5,469,983 A | 11/1995 | Yawata |
| 5,490,631 A | 2/1996 | Iioka et al. |
| 5,700,689 A | 12/1997 | Wuster |
| 5,707,751 A | 1/1998 | Garza et al. |
| 5,725,916 A | 3/1998 | Ishii et al. |
| 5,736,231 A | 4/1998 | Todt |
| 5,766,709 A | 6/1998 | Geddes et al. |
| 5,840,139 A | 11/1998 | Geddes et al. |
| 5,882,612 A | 3/1999 | Riley |
| 5,952,068 A | 9/1999 | Neale et al. |
| 5,954,217 A | 9/1999 | Brkovic et al. |
| 5,993,705 A | 11/1999 | Grischenko et al. |
| 6,030,476 A | 2/2000 | Geddes et al. |
| 6,085,970 A | 7/2000 | Sadlier |
| 6,098,829 A | 8/2000 | McHenry et al. |
| 6,129,653 A | 10/2000 | Fredericks et al. |
| 6,139,665 A | 10/2000 | Schmelzer et al. |
| 6,142,331 A | 11/2000 | Breining et al. |
| 6,152,363 A | 11/2000 | Rule, Jr. |
| 6,224,954 B1 | 5/2001 | Mitchell et al. |
| 6,364,149 B1 | 4/2002 | Smith |
| 6,536,657 B2 | 3/2003 | Van Handel |
| 6,729,534 B2 | 5/2004 | Van Handel |
| 6,739,470 B2 | 5/2004 | Yawata |
| 6,852,381 B2 | 2/2005 | Debraal et al. |
| 6,872,462 B2 | 3/2005 | Roberts et al. |
| 6,908,687 B2 | 6/2005 | Mendes et al. |
| 7,281,650 B1 | 10/2007 | Milan |
| 7,464,856 B2 | 12/2008 | Van Handel |
| 7,464,857 B2 | 12/2008 | Van Handel |
| 7,510,098 B2 * | 3/2009 | Hartjes et al. ............... 220/592.2 |
| 7,513,386 B2 * | 4/2009 | Hartjes et al. ............... 220/592.2 |
| 7,600,669 B2 * | 10/2009 | Van Handel .................. 229/403 |
| 2003/0015582 A1 | 1/2003 | Van Handel |
| 2003/0021921 A1 | 1/2003 | Debraal et al. |
| 2003/0121963 A1 | 7/2003 | Van Handel |
| 2004/0170814 A1 | 9/2004 | Van Handel |
| 2005/0029337 A1 | 2/2005 | Van Handel |
| 2005/0184074 A1 | 8/2005 | Simmons et al. |
| 2007/0000931 A1 | 1/2007 | Hartjes et al. |
| 2007/0029332 A1 | 2/2007 | Hartjes et al. |
| 2007/0114271 A1 | 5/2007 | Van Handel |
| 2007/0240811 A1 | 10/2007 | Baggot et al. |
| 2008/0093434 A1 | 4/2008 | Van Handel |
| 2010/0224529 A1 | 9/2010 | Forloni |
| 2010/0224637 A1 | 9/2010 | Ikeda et al. |

FOREIGN PATENT DOCUMENTS

| | | |
|---|---|---|
| JP | 2000-177785 A | 6/2000 |
| JP | 57-065158 A | 4/2009 |
| WO | 2007005793 A1 | 1/2007 |

OTHER PUBLICATIONS

Williams, Mark B. et al. "Investigation of Spatial Resolution and Efficiency Using Pinholes with Small Pinhole Angle". Nuclear Science Symposium Conference Record, 2002 IEEE. Nov. 10-16, 2002, p. 1760-1764 vol. 3.

* cited by examiner

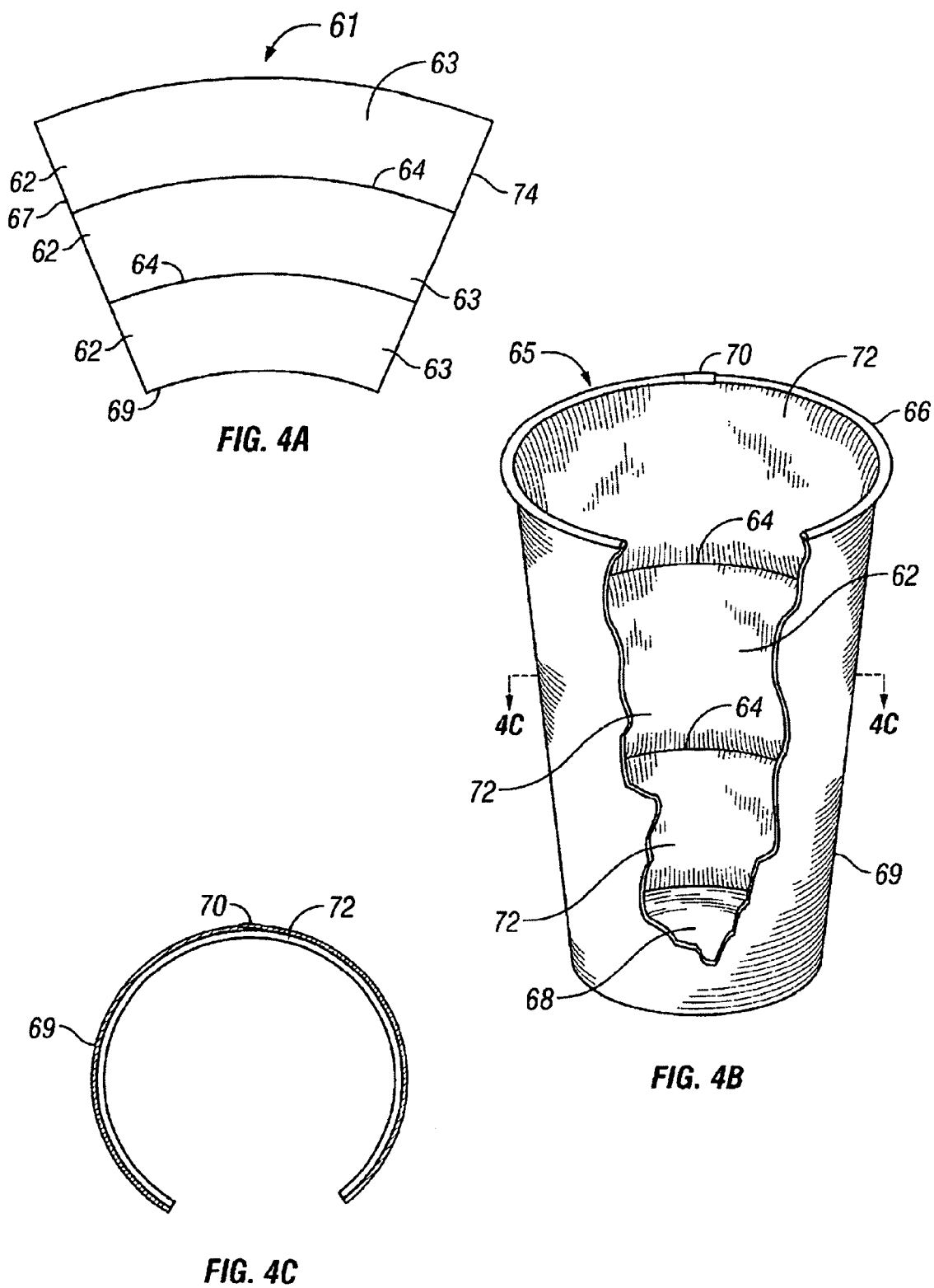

DISPOSABLE THERMALLY INSULATED CUP AND BLANK THEREFOR

RELATED APPLICATIONS

This application is a continuation of 37 C.F.R.§1.53 (b)(1) of U.S. patent application Ser. No. 11/613,834, filed, Dec. 20, 2006, now U.S. Pat. No. 7,600,669, which is a continuation of U.S. patent application Ser. No. 10/797,949, filed Mar. 10, 2004, now U.S. Pat. No. 7,464,856, which is a continuation of U.S. patent application Ser. No. 10/367,288, filed, Feb. 14, 2003, now U.S. Pat. No. 6,729,534, which is a continuation of U.S. patent application Ser. No. 10/199,211, filed, Jul. 19, 2002, now U.S. Pat. No. 6,536,657, which is the non-provisional application of United States Provisional Patent Application Ser. No. 60/306,757, filed Jul. 20, 2001, by the same inventor and having common Assignee, the contents of all prior applications and, patents are incorporated herein in their entirety by reference.

FIELD OF THE INVENTION

The present invention relates generally to container blanks and more particularly to a blank for a disposable thermally insulated container such as a paper cup.

BACKGROUND OF THE INVENTION

Disposable paper cups with heat insulating capability are a desirable and widely used commodity. These types of cups are designed for hot liquid contents such as hot coffee/tea/chocolate and tend to maintain the liquid contents' temperature by preventing undesirable heat transfer from the hot liquid contents inside the cup to the cup holder's hand holding the cup. These cups may also be used for cold liquid contents in which case the insulated walls of the cup help maintain the cold liquid contents' temperature by preventing undesirable heat transfer from the cup holder's hand to the cold liquid contents.

Thermally insulated cups come in various known configurations. For example, an insulated cup is disclosed in Amberg et al. (U.S. Pat. No. 3,737,093) which uses a plastic cup placed within a paper cup to create air space therebetween for thermal insulation purposes. Another insulated cup is disclosed by Iioka (U.S. Pat. No. 4,435,344) which coats a paper cup with a thermoplastic synthetic resin film which is subsequently heated to form a foamed insulating layer. Neale et al. (U.S. Pat. No. 5,952,068) deals with a cup insulation layer formed from syntactic foam, a type of foam which incorporates insulating particles held in place by a binder. The insulating particles may contain an air space.

None of the known insulated cups, however, is an effective thermal insulator. Furthermore, none of the known insulated cups can be manufactured at low cost on a wide scale due to complexity of fabrication, high cost of materials, and the like.

SUMMARY OF THE INVENTION

The present invention is generally directed to a container blank comprising at least one substrate layer made of disposable material and at least one film layer disposed substantially over the substrate layer and having at least one portion adapted to shrink away from the substrate layer upon application of heat. The shrunk film layer portion is adapted to thermally insulate the substrate layer located substantially behind the shrunk film layer portion.

These and other aspects of the present invention will become apparent from a review of the accompanying drawings and the following detailed description of the preferred embodiments of the present invention.

BRIEF DESCRIPTION OF THE DRAWINGS

The invention is generally shown by way of example in the accompanying drawings in which:

FIG. 4A is a plan view of a fourth disposable insulated cup blank comprising shrink film which is pattern adhered to a paperboard substrate in a fourth sealing pattern in accordance with the present invention;

FIG. 4B is a partially cut away front perspective view of a disposable insulated cup formed from the blank of FIG. 4A in accordance with the present invention;

FIG. 4C is a cross sectional view taken along line 4C-4C of FIG. 4B;

DETAILED DESCRIPTION OF THE PREFERRED EMBODIMENTS

Figure 1A:
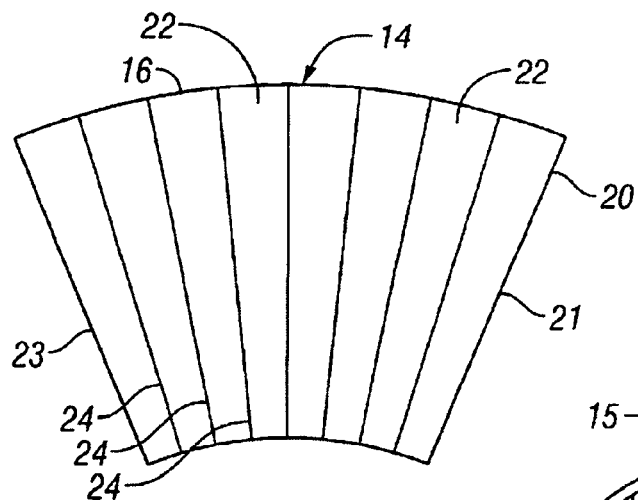
FIG. 1A is a side plan view of a first disposable insulated cup blank comprising shrink film which is pattern adhered to a paperboard substrate in a first sealing pattern in accordance with the present invention.

Hereinafter, some preferred embodiments of the present invention will be described in detail with reference to the related drawings of FIGS. 1-8. Additional embodiments, features and/or advantages of the invention will become apparent from the ensuing description or may be learned by the practice of the invention.

In the Figures, the drawings are not to scale and reference numerals indicate the various features of the invention, like numerals referring to like features throughout both the drawings and the description.

The following description includes the best mode presently contemplated for carrying out the invention. This description is not to be taken in a limiting sense, but is made merely for the purpose of describing the general principles of the invention.

Figure 1B:
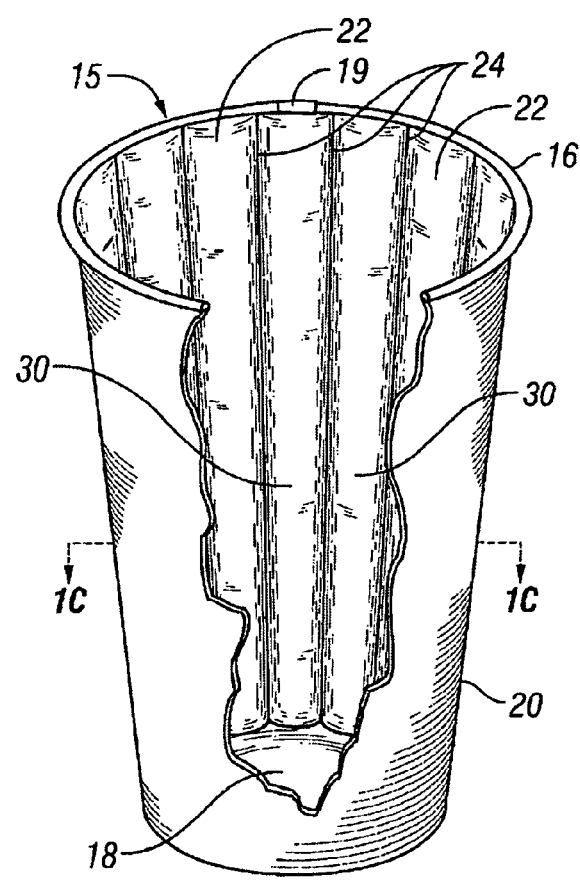
FIG. 1B is a partially cut away front perspective view of a disposable insulated cup formed from the blank of FIG. 1A in accordance with the present invention.
Figure 1C:
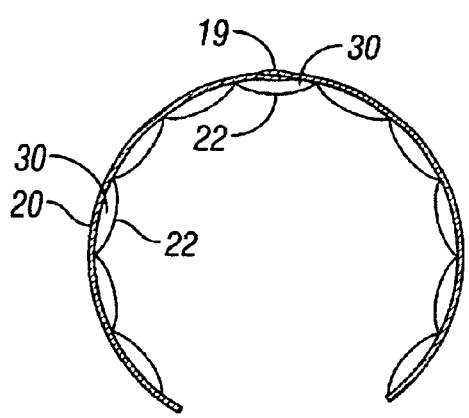
FIG. 1C is a cross sectional view taken along line 1C-1C of FIG. 1B.

In accordance with a preferred embodiment of the present invention and as generally shown in FIGS. 1A-1C, an elongated cup blank 14 (FIG. 1A) used to form a disposable thermally insulated cup 15 (FIG. 1B) is constructed from a paperboard substrate 20 having a strip of heat-activated shrink film 22 pattern-adhered to one side along a plurality of generally vertical seal lines 24. Heat-activated shrink film suitable for practicing the present invention may be of the uniaxial or biaxial shrink film type which is available commercially from shrink film manufacturers such as DuPont® Corp. of Wilmington, Del. One example of a biaxial shrink film is DuPont® CLYSAR ABL® industrial shrink film. A uniaxial shrink film may be produced, for example, using an extrusion coating technique described hereinbelow in reference to FIG. 8.

In general, biaxial shrink films are preferred for performance reasons. However, uniaxial shrink films provide satisfactory performance and are generally easier to apply in extrusion laminating and coating processes. The generally flat vertical sealing band pattern depicted in FIG. 1A extends between what will be an open cup top 16 (FIG. 1B) and a closed cup bottom 18 (FIG. 1B) of disposable thermally insulated cup 15. In one example, seal lines 24 may be spaced apart by about one inch with a seal line thickness of about one-sixteenth of an inch. Other seal line configurations may be utilized provided such other configurations do not depart from the intended purpose of the present invention.

Elongated cup blank 14 has (opposing) side edges 21, 23 (FIG. 1A) which are sealed together along a generally elongated seam 19 (FIGS. 1B-1C) to form disposable cup 15 (FIG. 1B) with the pattern adhered shrink film 22 remaining on the interior side of the cup. The exterior side of cup 15 may have decorative graphics (not shown). The formed cup is then, preferably, run through an oven at sufficiently high temperature and for a period of time enough to cause heat-activated film 22 to sufficiently shrink, or pull away from paperboard substrate 20 (between seal lines 24) so as to form outwardly (away from the interior side of the cup) bulging and generally vertical air pockets 30 (FIGS. 1B-1C) which continuously run from bottom 18 to top 16 (of cup 15) over seam 19 and thermally insulate the entire exterior side of cup 15 from hot liquid contents such as hot coffee, tea or the like. Actual amount of shrinkage would also depend on film thickness. In general, care should be exercised to pick a gauge of heat-activated shrink film which would form pocket walls that do not easily puncture during normal use.

A person skilled in the art would readily recognize that thermally insulated disposable cup 15 of FIG. 1B may also be used to insulate a cup holder's hand from ice-cold contents, e.g. ice-cold soda, water, and the like.

Figures 2A, 2B, 2C:
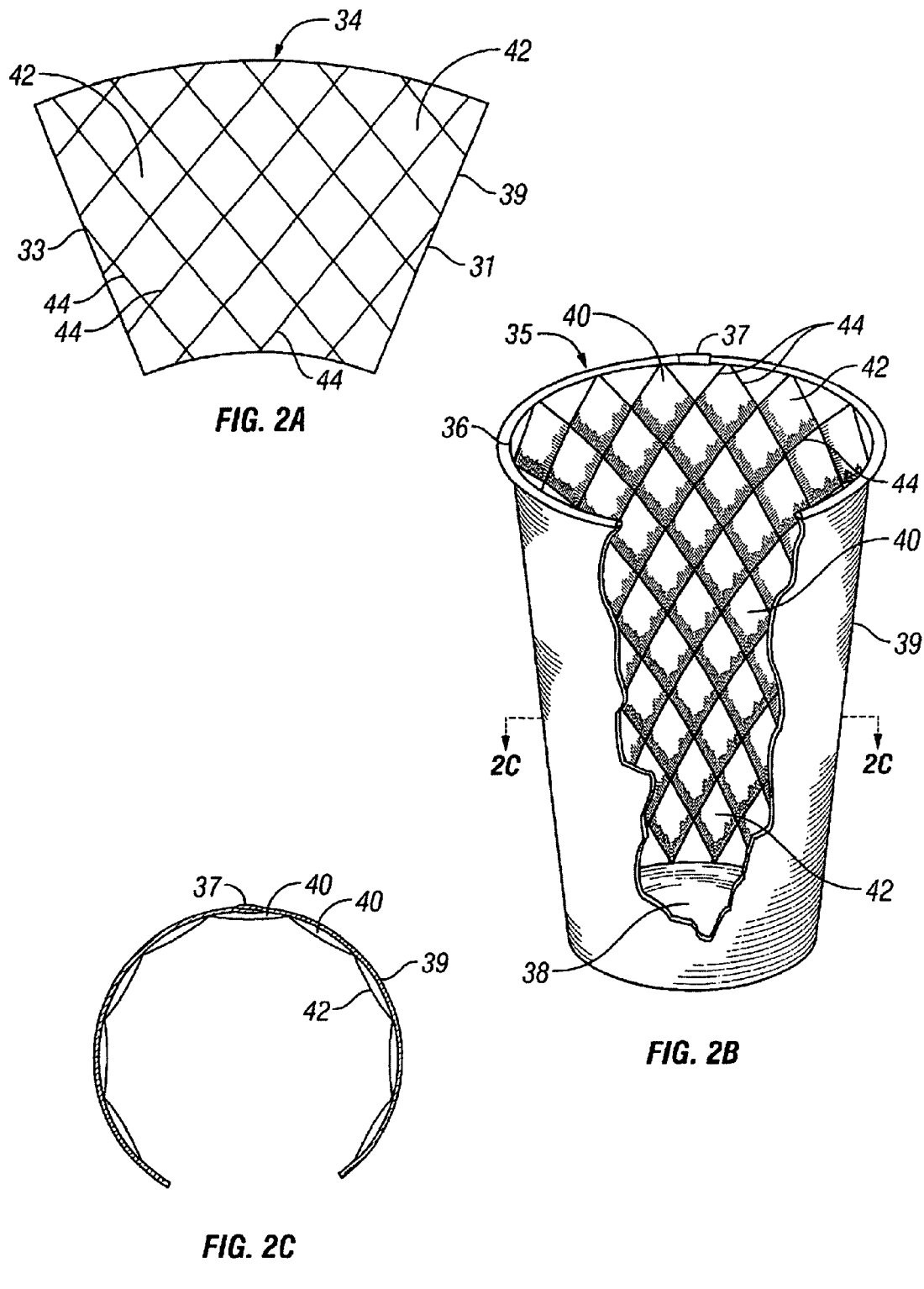
FIG. 2A is a plan view of a second disposable insulated cup blank comprising shrink film which is pattern adhered to a paperboard substrate in a second sealing pattern in accordance with the present invention.
FIG. 2B is a partially cut away front perspective view of a disposable insulated cup formed from the blank of FIG. 2A in accordance with the present invention.
FIG. 2C is a cross sectional view taken along line 2C-2C of FIG. 2B.

In accordance with another preferred embodiment of the present invention and as generally shown in FIGS. 2A-2C, an elongated cup blank 34 (FIG. 2A) used to form a disposable thermally insulated cup 35 (FIG. 2B) is constructed from a paperboard substrate 39 having heat-activated shrink film 42 adhered to one side along a plurality of generally criss-crossing seal lines 44. The sealing pattern depicted in FIG. 2A extends between what will be an open cup top 36 (FIG. 2B) and a closed cup bottom 38 (FIG. 2B) of disposable thermally insulated cup 35. In one example, criss-crossing seal lines 44 may form generally flat one-inch square or diamond-like pattern (FIG. 2A) with a seal line thickness of about one-sixteenth of an inch.

Elongated cup blank 34 includes side edges 31, 33 (FIG. 2A) which are sealed together along a generally elongated seam 37 (FIGS. 2B-2C) to form disposable cup 35 (FIG. 2B) with the pattern adhered shrink film 42 remaining on the interior side of the cup. The exterior side of cup 35 may have decorative graphics (not shown). The formed cup is then, preferably, run through an oven at sufficiently high temperature and for a period of time enough to cause heat-activated film 42 to sufficiently shrink, or pull away from paperboard substrate 39 (between seal lines 44) so as to form outwardly (away from the interior side of the cup) bulging air pockets 40 (FIGS. 2B-2C) which generally run from bottom 38 to top 36 (of cup 35) over seam 37 and thermally insulate the entire exterior side of cup 35 from hot liquid contents such as hot coffee, tea or the like. The newly formed thermally insulated disposable cup 35 may also be used to insulate a cup holder's hand from ice-cold contents.

Figures 3A, 3B, 3C:
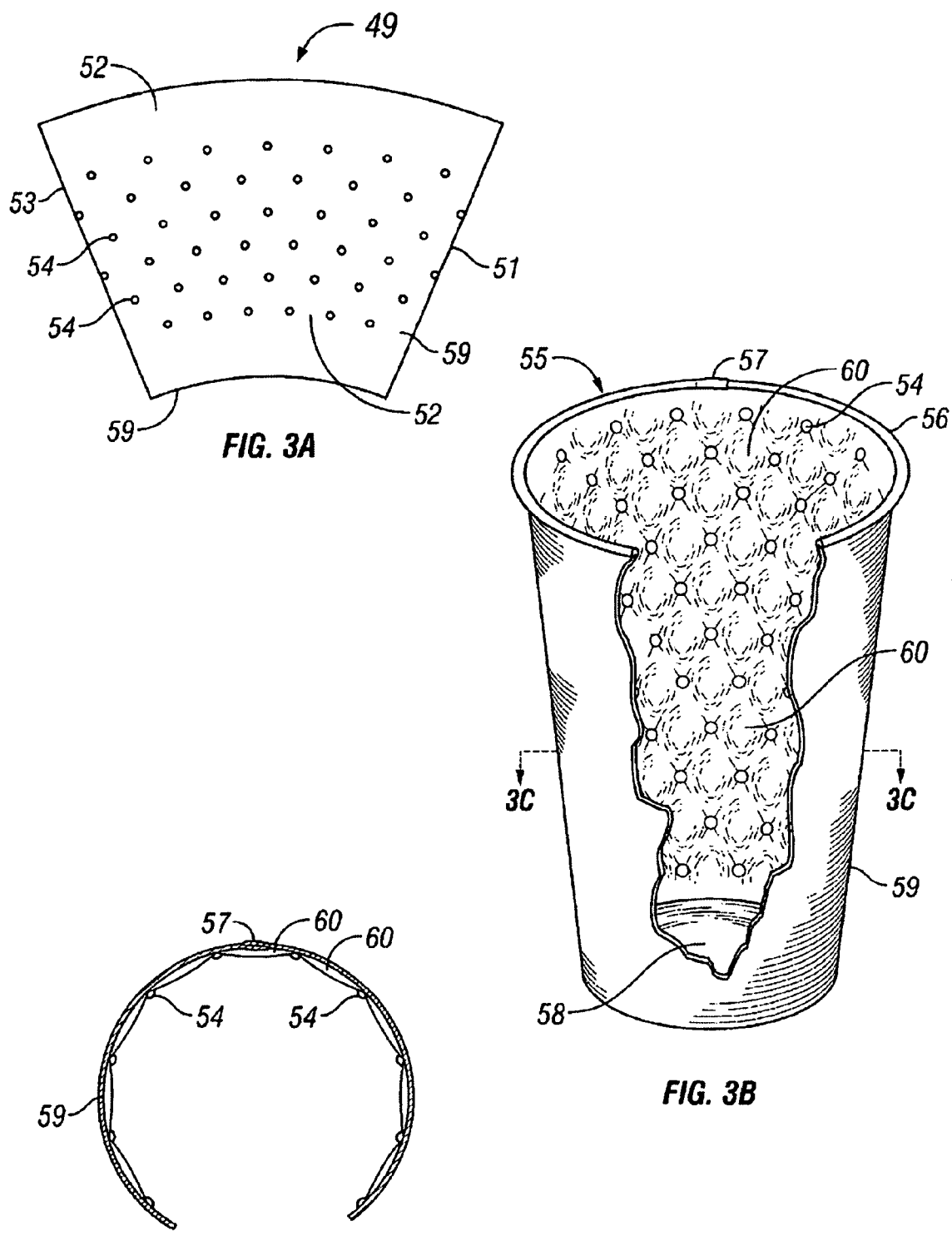
FIG. 3A is a plan view of a third disposable insulated cup blank comprising shrink film which is pattern adhered to a paperboard substrate in a third sealing pattern in accordance with the present invention.
FIG. 3B is a partially cut away front perspective view of a disposable insulated cup formed from the blank of FIG. 3A in accordance with the present invention.
FIG. 3C is a cross sectional view taken along line 3C-3C of FIG. 3B.

In accordance with yet another preferred embodiment of the present invention and as generally shown in FIGS. 3A-3C, an elongated cup blank 49 (FIG. 3A) used to form a disposable thermally insulated cup 55 (FIG. 3B) is constructed from a paperboard substrate 59 having heat-activated shrink film 52 adhered to one side via a plurality of seal spots or dots 54. The spot sealing pattern depicted in FIG. 3A extends between what will be an open cup top 56 (FIG. 3B) and a closed cup bottom 58 (FIG. 3B) of disposable thermally insulated cup 55. In one example, seal spots 54 may form a generally flat ¾-inch square pattern (FIG. 3A).

Elongated cup blank 49 includes side edges 51, 53 (FIG. 3A) which are sealed together along a generally elongated seam 57 (FIGS. 3B-3C) to form disposable cup 55 (FIG. 3B) with the pattern adhered shrink film 52 remaining on the interior side of the cup. The exterior side of cup 55 may have decorative graphics (not shown). The formed cup is then, preferably, run through an oven at sufficiently high temperature and for a period of time enough to cause heat-activated film 52 to sufficiently shrink, or pull away from paperboard substrate 59 (between seal spots 54) so as to form outwardly (away from the interior side of the cup) bulging air pockets 60 (FIGS. 3B-3C) which generally run from bottom 58 to top 56 (of cup 55) over seam 57 and thermally insulate the entire exterior side of cup 55 from hot liquid contents. The newly formed thermally insulated disposable cup 55 may also be used to insulate a cup holder's hand from ice-cold contents.

In accordance with still another preferred embodiment of the present invention and as generally shown in FIGS. 4A-4C, an elongated cup blank 61 (FIG. 4A) used to form a disposable thermally insulated cup 65 (FIG. 4B) is constructed from a paperboard substrate 69 having heat-activated shrink film 62 adhered to one side along a plurality of generally horizontal seal lines 64. The sealing pattern depicted in FIG. 4A extends between what will be an open cup top 66 (FIG. 4B) and a closed cup bottom 68 (FIG. 4B) of disposable thermally insulated cup 65. In one example, generally horizontal seal lines 64 may be spaced apart by about one inch forming generally flat, elongated and parallel horizontal bands 63 (FIG. 4A) with a seal line thickness of about one-sixteenth of an inch.

Elongated cup blank 61 includes side edges 67, 74 (FIG. 4A) which are sealed together along a generally elongated seam 70 (FIGS. 4B-4C) to form disposable cup 65 (FIG. 4B) with the pattern adhered shrink film 62 remaining on the interior side of the cup. The exterior side of cup 65 may have decorative graphics (not shown). The formed cup is then, preferably, run through an oven at sufficiently high temperature and for a period of time enough to cause heat-activated film 62 to sufficiently shrink, or pull away from paperboard substrate 69 (between seal lines 64) so as to form outwardly (away from the interior side of the cup) bulging and generally horizontal air pockets 72 (FIGS. 4B-4C) which run along the interior of the cup from bottom 68 to top 66 (of cup 65) over seam 70 and thermally insulate the entire exterior side of cup 65 from hot liquid contents such as hot coffee, tea or the like. The newly formed thermally insulated disposable cup 65 may also be used to insulate a cup holder's hand from ice-cold contents.

Figure 4D:
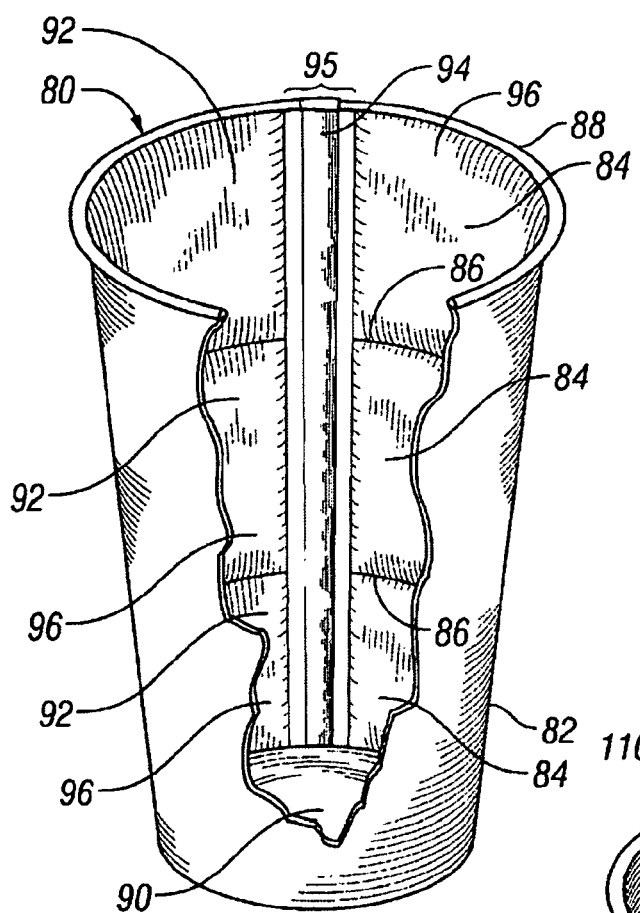
FIG. 4D is a partially cut away front perspective view of a disposable insulated cup formed from the blank of FIG. 4A in accordance with an alternative embodiment of the present invention.

In accordance with an alternative embodiment of the present invention and as generally illustrated in FIG. 4D, an elongated cup blank (not shown) comprising a paperboard substrate 82 having heat-activated shrink film 84 adhered to one side along a plurality of generally horizontal seal lines 86 is used to form a disposable thermally insulated cup 80 (FIG. 4D). The horizontal sealing pattern depicted in FIG. 4D preferably extends between an open cup top 88 and a closed cup bottom 90. In one example, generally horizontal seal lines 86 may be spaced apart by about one inch so as to form generally flat, elongated and parallel horizontal bands 92.

The opposite side edges of the cup blank are sealed together along a generally elongated seam 94 (FIG. 4D) to form disposable cup 80 with the pattern adhered shrink film 84 remaining on the interior side of the cup. The exterior side of cup 80 may have decorative graphics (not shown). The formed cup is then, preferably, run through an oven at sufficiently high temperature and for a period of time enough to cause heat-activated film 84 to sufficiently shrink, or pull away from paperboard substrate 82 (between seal lines 86) so as to form outwardly (away from the interior side of the cup) bulging and generally horizontal thermally insulating air pockets 96 (FIG. 4D).

As generally depicted in FIG. 4D, thermally insulating air pockets 96, preferably, run in the vertical direction along the interior of the cup from cup bottom 90 to cup top 88. In the horizontal direction, thermally insulating air pockets 96, preferably, run continuously along the interior of the cup on each side of elongated interior seam area 95 (which includes centrally seam 94), i.e. thermally insulating the entire exterior side of cup 80 except for the elongated exterior side area directly behind elongated interior seam area 95 (not shown). In this case, the disposable cup user should avoid touching the exterior side of disposable cup 80 in the area directly behind elongated interior seam area 95 as this area is not thermally insulated.

Figure 4E:
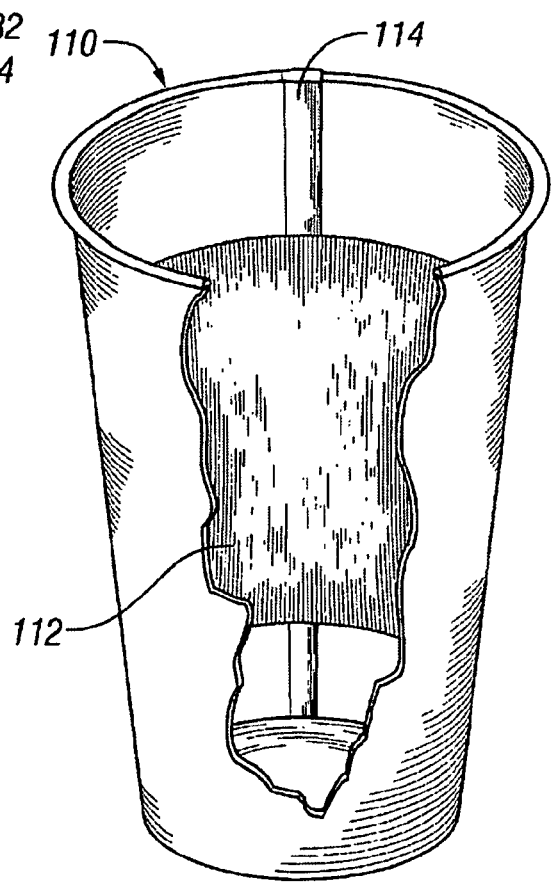
FIG. 4E is a partially cut away front perspective view of a disposable insulated cup formed from a modified blank of FIG. 4A in accordance with another alternative embodiment of the present invention.
Figure 4F:
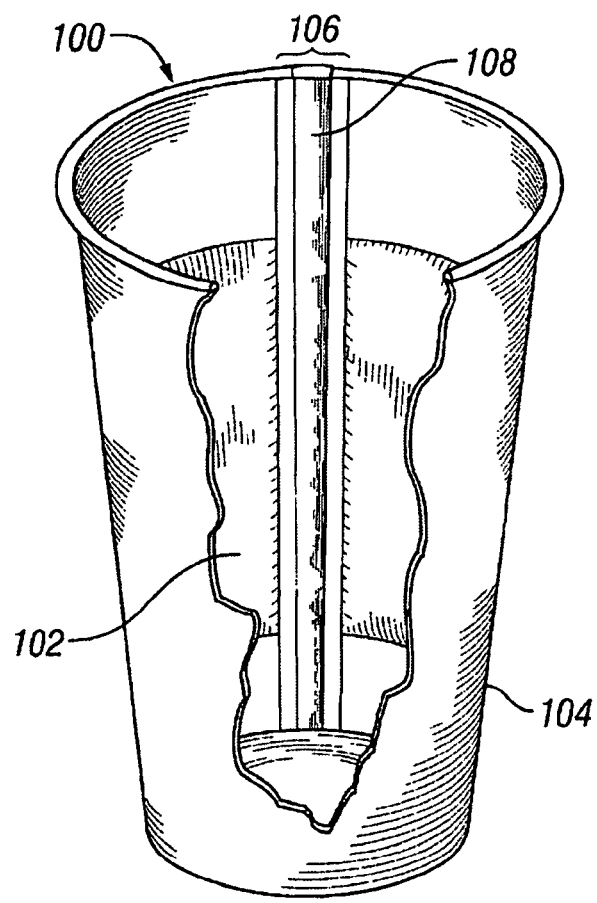
FIG. 4F is a partially cut away front perspective view of a disposable insulated cup formed from the modified blank of FIG. 4E in accordance with yet another alternative embodiment of the present invention.

FIG. 4F shows a disposable cup 100 which is similar in construction to cup 80 of FIG. 4D except that cup 100 has been provided with a single generally horizontal thermally insulating air pocket 102. Insulating air pocket 102 is preferably wider than its corresponding middle insulating air pocket 96 of FIG. 4D to provide greater insulation area and is adhered generally centrally to the interior surface of cup 100 on each side of an elongated interior seam area 106 (which includes centrally a seam 108). Horizontal air pocket 102 only provides thermal insulation coverage for the exterior surface of cup 100 located behind it with the exception of the elongated exterior side area located directly behind seam area 106 (not shown). Therefore, the disposable cup user should avoid touching the exterior surface of disposable cup 100 in any areas not covered by horizontal thermally insulating air pocket 102 as such areas are not thermally insulated.

FIG. 4E depicts a disposable cup 110 which is similar in construction to disposable cup 100 of FIG. 4F except that cup 110 has been been provided with a single generally horizontal thermally insulating air pocket 112 which provides greater thermal insulation coverage. Specifically, insulating air pocket 112 is attached generally centrally to the interior surface of cup 110 over a seam 114 so as to provide continuous thermal insulation coverage over the corresponding exterior surface area of the cup (not shown). The disposable cup user should avoid, however, touching exterior surface areas (of disposable cup 110) located directly above and below the thermal insulation area provided by horizontal air pocket 112 as such areas are not thermally insulated.

In one test conducted by Applicant, a 75 gauge DuPont® CLYSAR LLG® polyethylene shrink film, which is similar to DuPont® CLYSAR ABL® industrial shrink film, and a paperboard stock of basis weight of about 143 lb/3000 sq. ft. and thickness of about 0.0128 inch were used as starting materials for forming the disposable thermally insulated cup of the present invention. Paperboard stock of this type may be purchased from Georgia-Pacific Corporation of Atlanta, Ga., which manufactures the stock at its Naheola mill. The CLYSAR LLG® shrink film was heat-sealed to the Naheola paperboard stock using an impulse heat sealer which can be a VERTROD CORP® MODEL 20A®, 1200-watt, heat sealer. A heat setting of "6" was used. The resulting disposable cup blank has a generally horizontal seal pattern, as shown in FIG. 4A. The straight side edges of the disposable cup blank were then brought together in an overlapping configuration and sealed on a bench fixture. The bench fixture holds the blank in a conical configuration while the seam area is heated and then clamps the seal, holding it in place until cooled. The seal areas were heated with a Wagner® model HT1000, 1200 watt, heat gun. The truncated cone (without top curl or bottom) was placed in a forced air oven at about 260° F. for about 10 seconds to force the film to shrink or pull away from the paperboard so as to produce the desired thermal insulating pockets. Five-second and thirty-second oven tests at the same temperature were also conducted. However, the five-second oven test resulted in insufficient film shrinkage, while the thirty-second oven test resulted in cone distortion due to excessive film shrinkage. Best results were achieved with an oven residence time of about 10 seconds. A silicone RTV sealant was used to seal the bottom of the cup in place. The cup bottom may also be heat-sealed into place. The cup bottom material used was paperboard stock of basis weight of about 120 lb/3000 sq. ft. and thickness of about 0.0113 inch. The paperboard was extrusion coated with about 20 lb/3000 sq. ft. of low density polyethylene (LDPE). Top curl was added later in the process.

Figure 5:
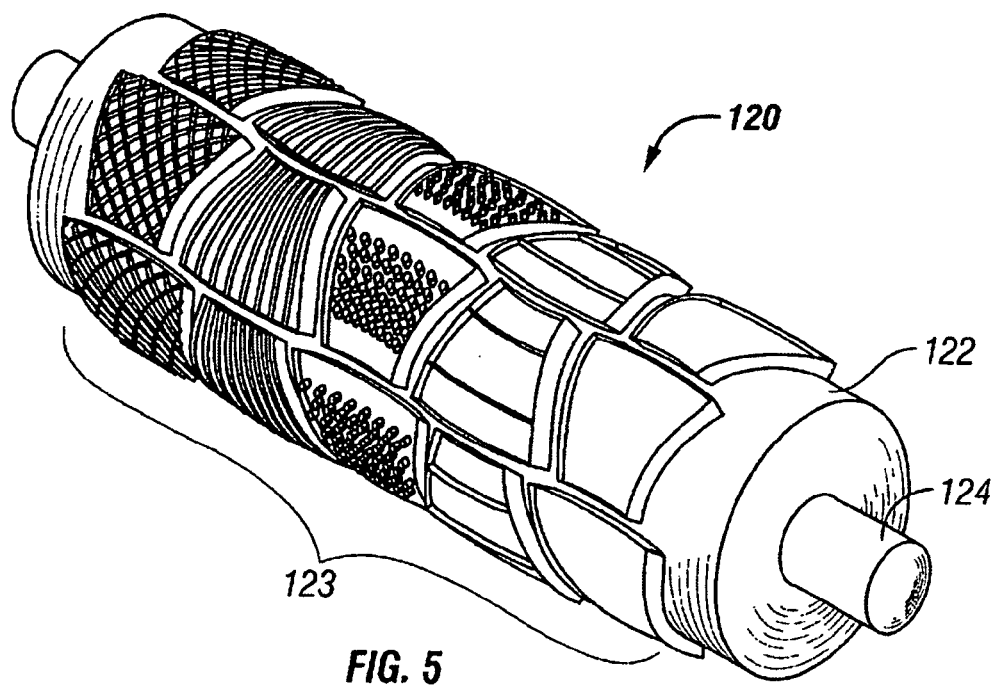
FIG. 5 is side perspective view of a roller used in accordance with the present invention.
Figure 8:
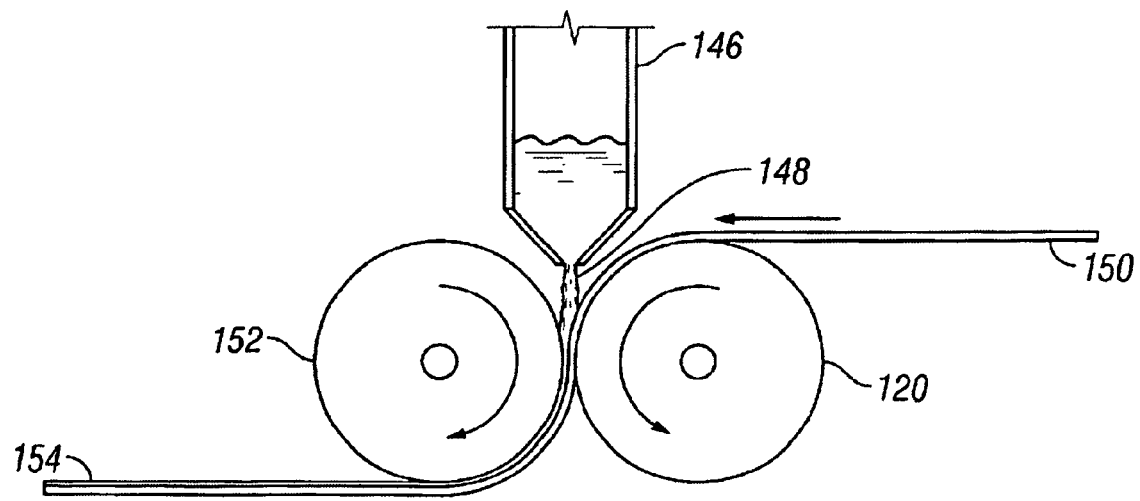
FIG. 8 is a schematic representation of an extrusion coating process in accordance with yet another embodiment of the present invention.

The above-described novel disposable thermally insulated cup may be mass produced using several commercial sealing methods such as, for example, rotary heat sealing (FIG. 6), adhesive lamination (FIG. 7), and extrusion coating (FIG. 8). All three methods employ a roller 120 comprising a solid generally cylindrical body 122 having a plurality of generally raised, cup blank-shaped regions 123 on its outer surface, and a shaft 124, as generally illustrated in FIG. 5. Raised, cup blank-shaped regions 123 are generally oriented in rows in a back/forth pattern to minimize material usage. The resultant pattern requires that so-called scroll (zig-zag) slitting be used later in the manufacturing process. The cup blank-shaped regions may come in a single pattern or in a variety of patterns and are raised for printing, heat sealing, or for applying pressure during extrusion coating. Specifically, the raised patterns on cylindrical body 122 are used to form the various seal lines, seal spots described hereinabove.

Figure 6:
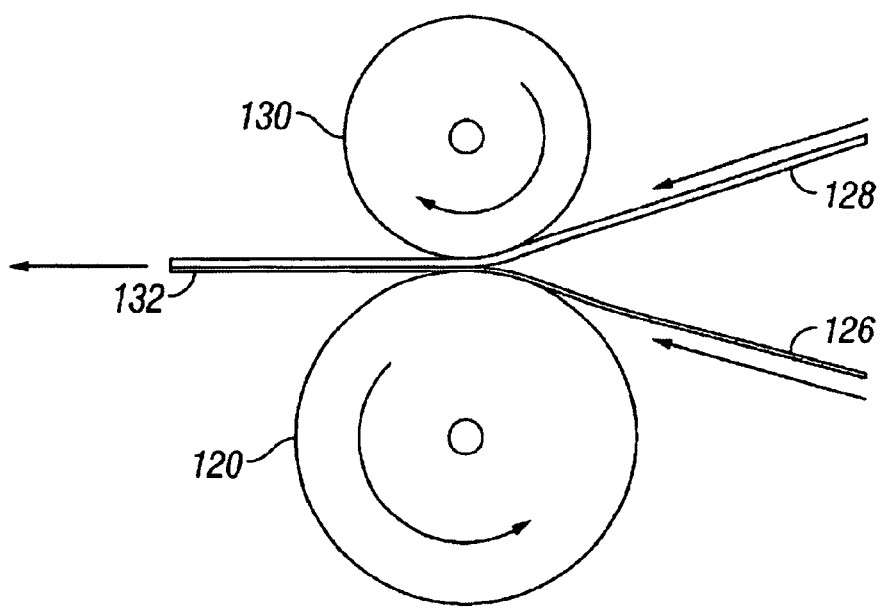
FIG. 6 is a schematic representation of a rotary heat sealing process in accordance with one embodiment of the present invention.

As generally depicted in FIG. 6, a moving shrink film 126 and a moving paperboard stock 128 are brought together in the nip formed by heated roller 120 and a pressure roller 130. Heated roller 120 and pressure roller 130 heat-seal shrink film 126 onto paperboard stock 128 in the various patterns of FIGS. 1A, 2A, 3A, 4A producing a web of heat-sealed patterns 132 from which elongated cup blanks will be cut (FIG. 6).

Figure 7:
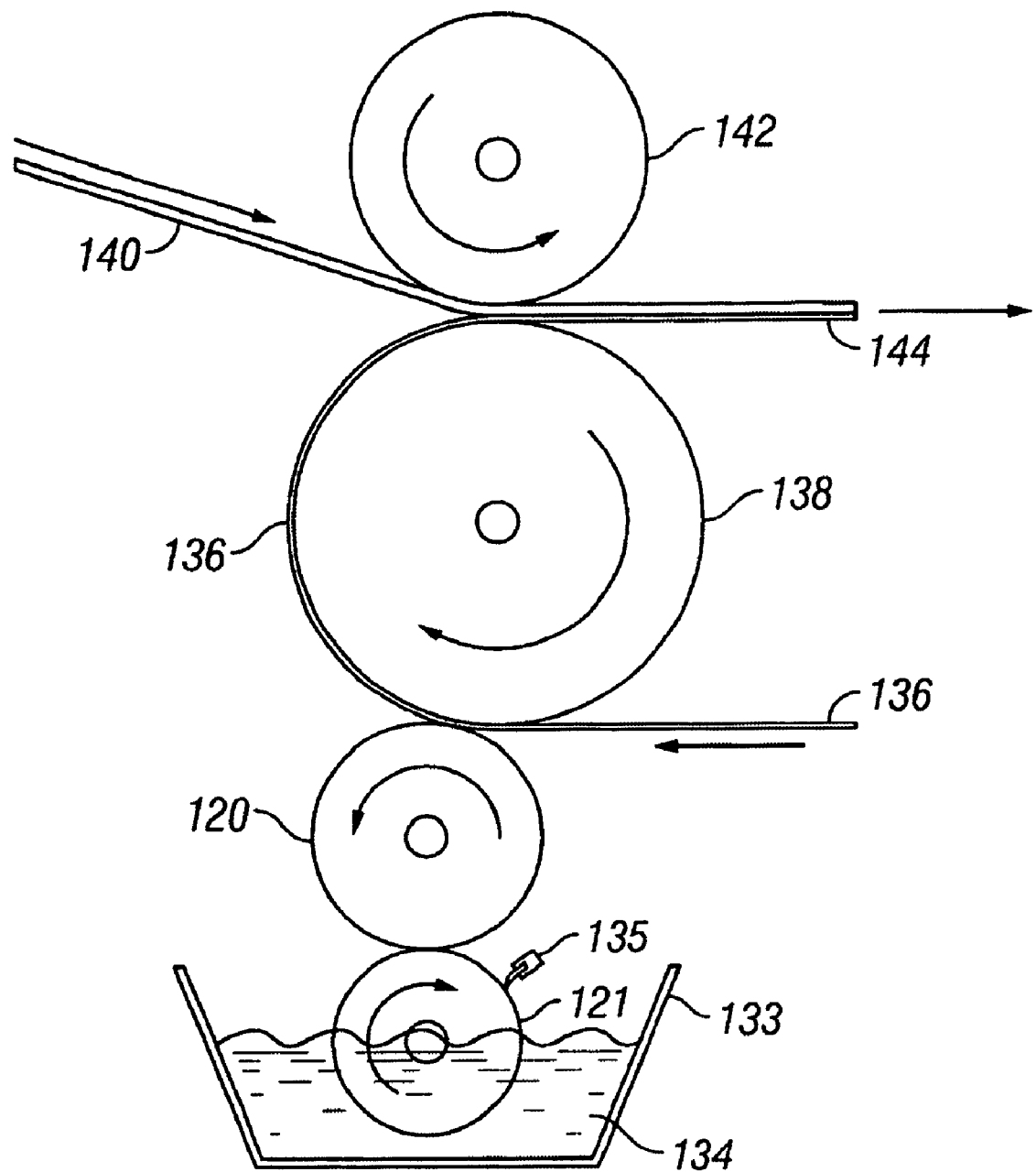
FIG. 7 is a schematic representation of an adhesive lamination process in accordance with another embodiment of the present invention.

The adhesive lamination technique generally shown in FIG. 7 uses roller 120 essentially as a flexographic printing or application roller to apply adhesive 134 to shrink film 136 which rides around a roller 138. Adhesive 134, which is contained in a pan 133, is applied to application roller 120 via a conventional anilox roller 121 which is in rotational contact with application roller 120. Anilox roller 121, which is dipped to a certain extent in adhesive pan 133, picks up adhesive 134 for transfer to application roller 120. A blade 135 is also provided, as generally shown in FIG. 7, to automatically scrape away excess adhesive from anilox roller 121 during operation. The shrink film with the applied adhesive is then laminated to a moving paperboard stock 140 in the nip formed by film roller 138 and a pressure roller 142 in the various patterns of FIGS. 1A, 2A, 3A, 4A producing a web of adhesively sealed patterns 144 from which elongated cup blanks will be cut (FIG. 7).

The extrusion coating technique of FIG. 8 uses roller 120 as an impression roller. Specifically, an extrusion die 146 applies a continuous stream of polymer melt 148 to a moving paperboard stock 150 in the nip formed by impression roller 120 and a chill roll 152 (FIG. 8). Chill roll 152 turns polymer 148 from liquid form to a film at the same time as the polymer is being adhered to moving paperboard stock 150 by impression roller 120 in the various patterns of FIGS. 1A, 2A, 3A, 4A producing a pattern-adhered web 154 from which elongated cup blanks will be cut (FIG. 8).

Alternatively, a heated mandrel having at least one undercut section and raised ridges (not shown) may be used to heat-seal shrink film onto the paperboard stock. The resulting cup blank may include, for example, a single centrally located insulating band which can be used to form disposable thermally insulated cup 100 of FIG. 4F. In this regard, a mandrel heated to about 240° F. was used by Applicant to produce a prototype disposable thermally insulated cup of the type shown in FIG. 4F.

In general, the following manufacturing steps may be used to produce the novel disposable thermally insulated cup. Step 1 involves printing or decorating one side of the paperboard stock, this side will be used to form exterior cup sides. Step 2 deals with pattern-adhering of the shrink film onto the opposite side of the paperboard stock to produce a pattern-sealed web using one of the above-described techniques, i.e. extrusion coating, rotary heat sealing, or adhesive lamination. This side will be used to form the interior cup sides. The end result is a roll of paperboard stock with pattern-adhered film which is then taken to a slitter. The slitter cuts the paperboard stock/ pattern-adhered film roll into narrower rolls corresponding to the width needed to cut a series of cup blanks (Step 3). The slit rolls are then placed one at a time on a cup-making machine which forms the entire cup, i.e. cuts the cup blanks from the rolls, seals the side seams, attaches cup bottoms, and applies top curls (Step 4). Step 5 includes placing the formed cups in an oven at sufficiently high temperature and for a period of time enough to cause the pattern-adhered film to sufficiently shrink, or pull away from the paperboard stock so as to form the thermally insulating air pockets described hereinabove and shown, for example in FIGS. 1B, 2B, 3B, 4B, and 4D-4F. After that the thermally insulated disposable cups are taken out of the oven and cooled at ambient (room) temperature (Step 6). The cooled thermally insulated disposable cups are then shipped to customers or stored by the manufacturer for future shipment (step 7).

In accordance with another preferred embodiment of the present invention, above-described steps 5-6 may be avoided entirely if the film used in above-described pattern-adhering step 2 is capable of automatically shrinking or pulling away from the interior paperboard wall of the cup at a temperature range of about 180°-190° F. so as to form thermally insulating air pockets, i.e. after the pouring of a hot liquid such as hot coffee, tea, or the like. Hot coffee temperature, for example, is generally in the same range, i.e., 180°-190° F. In this regard, the following two experiments were performed by Applicant to prove that hot liquids can be used to effect shrinking of such heat-shrinkable films on the interior of disposable cups.

A DuPont® Clysar ABL® 200 shrink film was sealed with a Vertrod® impulse heat sealer to the top and bottom of a cup blank which was polyethylene (PE) coated on both sides. The cup blank was then heat-sealed into a truncated cone into which a bottom was sealed with RTV (room temperature vulcanizing) silicone. The truncated cone was not top curled. Thereafter, water at about 190° F. was poured into the conical shell. It was subsequently found that the film had shrunk only if it contained a pinhole or if it had been intentionally pre-slit. In the areas where there was no break in the film, partial vacuum had developed which prevented the film from shrinking or pulling away from the interior wall of the conical shell. The pre-applied PE coating on the two sides of the cup blank prevented air intrusion between the shrink film and the interior (PE-coated) wall of the conical shell. To alleviate the partial vacuum problem, a series of pinholes were punched through the cup blank (to allow air intrusion) prior to heat-sealing the shrink film to the paperboard stock and the experiment was repeated. This time the pattern-adhered film shrunk sufficiently (after the pouring of hot water) to automatically form the desired thermally insulating air pockets.

A person skilled in the art would recognize that other types of shrink films capable of performing at other hot liquid temperature ranges may be utilized to achieve the above results provided such other types of shrink film do not depart from the intended purpose of the present invention. A person skilled in the art would also recognize that the above results may be achieved using uncoated paperboard stock or paperboard stock that is coated only on one side with PE. Other configurations and/or modifications may be used, providing no departure from the scope and spirit of the invention occurs.

A disposable cup with a pattern-adhered insulating shrink film interior capable of automatically shrinking, or pulling away from the interior wall of the cup after pouring a hot liquid so as to form thermally insulating air pockets would only be suitable for insulating a cup holder's hand from hot contents. Pouring of cold liquids in such a cup would not trigger any film shrinkage and should, therefore, be avoided. In general, the manufacture of such disposable cups, i.e. cups that are capable of automatic heat-insulation, should be preferred from a manufacturer's point of view due to reduced cost of manufacture (above-described steps 5-6 being omitted) which would translate into a reduced overall cost, and reduced overall volume of nested or stacked cups which can be advantageous for storage and/or shipping purposes.

A person skilled in the art should recognize that the above-described novel disposable cup provides improved thermal insulation capability over known disposable insulated cups. The novel disposable cup also exhibits no tendency to soften (i.e., deform) under hot liquid contents as, for example, conventional foam cups tend to do. Moreover, the novel disposable cup may be manufactured with higher quality graphics (decoration) on its exterior side compared to known disposable cups which tend to have a so-called "blistered" outer surface which distorts somewhat the applied graphics. The above-described novel disposable thermally insulated cup manufacturing process may be employed in any field or application where effective thermal insulation capability is required. An alternative application may include cushioning capability for packaging, and the like.

While the present invention has been described in detail with regards to the preferred embodiments, it should also be appreciated that various modifications and variations may be made without departing from the scope or spirit of the invention. It is important to note that practicing the invention is not limited to the applications described hereinabove. Many other applications and/or alterations may be utilized provided that such other applications and/or alterations do not depart from the intended purpose of the present invention.

It should further be appreciated by a person skilled in the art that features illustrated or described as part of one embodiment can be used in another embodiment to provide yet another embodiment such that the features are not limited to the specific embodiments described above. Thus, it is intended that the present invention cover all such modifications, embodiments and variations as long as such modifications, embodiments and variations come within the scope of the appended claims and their equivalents.

What is claimed is:

1. A beverage container, comprising:
   (a) a sidewall having an outer surface and an inner surface as well as one or more perforations to allow air intrusion; and
   (b) at least one air pocket formed on said inner surface by at least one strip of shrink film being coupled to said inner surface in at least one pattern and adapted to pull away from said inner surface of said sidewall according to said at least one pattern upon application of heat sufficient to form said at least one air pocket, said at least one air pocket thermally insulating a portion of said outer surface located directly behind said at least one air pocket.

2. The container according to claim 1, wherein the shrink film is secured to the inner surface of said sidewall with a plurality of generally parallel equally spaced seal lines extending from the lower portion of the sidewall to the upper portion thereof such that the shrunk film provides a plurality of generally parallel, generally vertically oriented thermally insulating air pockets extending from the lower portion of the sidewall of the container to the upper portion of the sidewall of the container.

3. The container according to claim 1, wherein the shrink film is secured to the inner surface of said sidewall with a plurality of generally criss-crossing seal lines defining a diamond-like pattern extending from the lower portion of the sidewall to the upper portion thereof such that the shrunk film provides a plurality of thermally insulating air pockets on both the lower portion of the sidewall of the container and the upper portion of the sidewall of the container.

4. The container according to claim 1, wherein the shrink film layer is secured to the inner surface of said sidewall with a plurality of generally equally spaced seal points on both the lower portion of the sidewall and the upper portion thereof such that the shrunk film provides a plurality of thermally insulating air pockets on both the lower portion of the sidewall of the container and the upper portion of the sidewall of the container.

5. The container according to claim 4, wherein the shrink film layer is secured to the inner surface of said sidewall with a plurality of generally equally spaced seal points arranged in a square pattern.

6. The container according to claim 1, wherein the shrink film layer is secured to the inner surface of said sidewall with a plurality of generally parallel equally spaced seal lines extending across the lower portion of the sidewall and the upper portion thereof such that the shrunk film provides a plurality of generally parallel, generally horizontally oriented thermally insulating air pockets extending circumferentially around the sidewall of the container on both the upper and lower portions of the sidewall of the container.

7. A beverage container, comprising:
   (a) a sidewall extending between a closed bottom and an open top, said sidewall having an outer surface, an inner surface, and a substantially elongated seam area defined between said closed bottom and said open top as well as one or more perforations to allow air intrusion; and
   (b) at least one substantially horizontal air pocket formed on said inner surface by at least one strip of shrink film being coupled to said inner surface in at least one pattern and adapted to pull away from said inner surface of said sidewall according to said at least one pattern upon application of heat at a temperature range sufficient to form said at least one substantially horizontal air pocket, said at least one substantially horizontal air pocket adapted to cover said substantially elongated seam area and to thermally insulate a portion of said outer surface located directly behind said at least one substantially horizontal air pocket.

8. A beverage container, comprising:
   (a) a sidewall extending between a closed bottom and an open top, said sidewall having an outer surface, an inner surface, and a substantially elongated seam area defined between said closed bottom and said open top as well as one or more perforations to allow air intrusion; and
   (b) at least one substantially horizontal air pocket formed on said inner surface by at least one strip of shrink film being coupled to said inner surface in at least one pattern and adapted to pull away from said inner surface of said sidewall according to said at least one pattern upon application of heat sufficient to form said at least one substantially horizontal air pocket, said at least one substantially horizontal air pocket adapted to thermally insulate a portion of said outer surface located directly behind said at least one substantially horizontal air pocket except for said substantially elongated seam area.

9. The beverage container of claim 8, wherein heat is applied at a temperature range of about 180°-190° F.

10. A container blank, comprising:
    (a) a substrate layer made of a disposable material suitable for forming a sidewall of a container, wherein the substrate layer has an interior and an exterior as well as one or more perforations to allow air intrusion;
    (b) a shrink film layer having upper and lower portions corresponding to their relative positions on the sidewall of the container, secured to the interior of the substrate layer on both the upper and lower portions of the shrink film layer, wherein the shrink film layer is adapted to shrink away from the substrate layer upon application of heat thereto, thereby providing a shrunk film layer secured to the interior of the substrate layer on both the upper and lower portions of the shrink film layer after heat is applied to the shrink film layer; and whereby the shrunk film layer provides at least one thermal insulating pocket between the substrate layer and the shrunk film layer and wherein the shrunk film layer is secured at both its upper and lower portions to the container sidewall.

11. The container blank of claim 10, wherein the shrink film is capable of automatically pulling away from the interior of the substrate layer at a temperature range of about 180°-190° F.

12. The container blank according to claim 10, wherein the shrink film layer is a biaxially oriented shrink film.

13. The container blank according to claim 10, wherein the shrink film layer is a uniaxially oriented shrink film.

14. The container blank according to claim 10, wherein the shrink film layer is secured to the inner surface of the substrate layer by a method selected from the group consisting of extrusion coating, rotary heat sealing, and adhesive lamination.

15. The container blank according to claim 10, wherein the shrink film layer is secured to the interior of the substrate layer with a plurality of generally parallel equally spaced seal lines extending from the lower portion of the shrink film layer to the upper portion thereof such that the shrunk film provides a plurality of generally parallel, generally vertically oriented thermally insulating air pockets extending from the lower portion of the sidewall of a container made from the blank to the upper portion of the sidewall of the container made from the blank.

16. The container blank according to claim 10, wherein the shrink film layer is secured to the interior of the substrate layer with a plurality of generally criss-crossing seal lines defining a diamond-like pattern extending from the lower portion of the shrink film layer to the upper portion thereof such that the shrunk film provides a plurality of thermally insulating air pockets on both the lower portion of the sidewall of a container made from the blank and the upper portion of the sidewall of the container made from the blank.

17. The container blank according to claim 10, wherein the shrink film layer is secured to the interior of the substrate layer with a plurality of generally equally spaced seal points on both the lower portion of the shrink film layer and the upper portion thereof such that the shrunk film provides a plurality of thermally insulating air pockets on both the lower portion of the sidewall of a container made from the blank and the upper portion of the sidewall of the container made from the blank.

18. The container blank of claim 17, wherein the shrink film layer is secured to the interior of the container blank with a plurality of generally equally spaced seal points arranged in a square pattern.

19. The container blank according to claim 10, wherein the shrink film layer is secured to the interior of the substrate layer with a plurality of generally parallel equally spaced seal lines extending across the lower portion of the shrink film layer and the upper portion thereof such that the shrunk film provides a plurality of generally parallel, generally horizontally oriented thermally insulating air pockets extending circumferentially around the sidewall of a container made from the blank on both the upper and lower portions of the sidewall of the container made from the blank.

* * * * *